United States Patent [19]
Cadd

[11] Patent Number: 5,586,120
[45] Date of Patent: *Dec. 17, 1996

[54] METHOD FOR A CHANNEL HOPPING COMMUNICATION SYSTEM WITH VARIABLE TRANSMISSION BANDWIDTH

[75] Inventor: Jim Cadd, Coral Springs, Fla.

[73] Assignee: Motorola, Inc., Schaumburg, Ill.

[ * ] Notice: The term of this patent shall not extend beyond the expiration date of Pat. No. 5,504,750.

[21] Appl. No.: 498,452

[22] Filed: Jul. 5, 1995

[51] Int. Cl.$^6$ .................................. H04J 3/16; H04J 3/06
[52] U.S. Cl. ......................... 370/468; 370/329; 370/496; 375/202
[58] Field of Search .............................. 370/18, 50, 69.1, 370/76, 85.2, 85.3, 85.6, 95.1, 95.2, 95.3, 17; 375/200, 202, 205, 206, 219, 203; 340/825.03, 825.06, 825.44, 825.5, 825.51

[56] References Cited

U.S. PATENT DOCUMENTS

| | | | |
|---|---|---|---|
| 4,554,668 | 11/1985 | Deman et al. | 375/202 |
| 4,597,087 | 6/1986 | Kadin | 375/202 |
| 4,850,036 | 7/1989 | Smith | 455/179 |
| 5,134,615 | 7/1992 | Freeburg et al. | 370/95.3 |
| 5,142,534 | 8/1992 | Simpson et al. | 370/95.1 |
| 5,257,398 | 10/1993 | Schaeffer | 455/33.1 |
| 5,287,384 | 2/1994 | Avery et al. | 375/202 |
| 5,291,475 | 3/1994 | Bruckert | 370/95.1 |
| 5,297,144 | 3/1994 | Gilbert et al. | 370/95.2 |
| 5,361,401 | 11/1994 | Pririllo | 455/62 |
| 5,381,443 | 1/1995 | Borth et al. | 375/202 |
| 5,504,750 | 4/1996 | Fulghum et al. | 370/95.1 |

*Primary Examiner*—Benedict V. Safourek
*Assistant Examiner*—Ricky Ngo
*Attorney, Agent, or Firm*—Andrew S. Fuller

[57] ABSTRACT

A radio communication system (100) operates according to a channel hopping protocol on communication channels grouped into channel blocks, including a channel block of reservation channels, from which channel hopping sequences are organized (810, 820). Each sequence has a communication channel from each channel block, including a reservation channel from the channel block of reservation channels (820). A first transceiver selects multiple sequences for operation (840, 842). The transceiver reserves a communication slot on each sequence such that corresponding communication slots exist on a group of channels simultaneously across the sequences (842, 844). The transceiver then operates within the communication slots on successive communication channels of the sequences according to the channel hopping protocol (846). A second transceiver may select a subset of the sequences of the first transceiver for its operation (860, 862, 864, 866).

19 Claims, 6 Drawing Sheets

5,586,120

METHOD FOR A CHANNEL HOPPING COMMUNICATION SYSTEM WITH VARIABLE TRANSMISSION BANDWIDTH

CROSS REFERENCE TO RELATED APPLICATIONS

This application is related to issued U.S. application Ser. No. 08/283,866, filed Aug. 1, 1994, by Fulghum, et al, entitled Method and Apparatus For A Radio Operating On Shared Communication Channels, now U.S. Pat. No. 5,504,750 and U.S. application Ser. No. 08/222,069, filed Apr. 4, 1994, by Cadd, et al and entitled "Method and Apparatus for Detecting and Handling Collisions in a Radio Communication System," and all assigned to Motorola, Inc.

TECHNICAL FIELD

This invention relates in general to a radio communication system, and more particularly, to a radio communication system having communication devices operating over shared communication channels under a self-governing protocol.

BACKGROUND OF THE INVENTION

Radio communication systems are known which support communication among several users operating in a wireless environment over radio frequencies. The frequencies used by these systems are a subset of the radio frequency spectrum, which are organized into one or more radio communication channels such as frequency channels. In such a system, for example, a communication link may be established between groups of communication devices within the radio system. The communication link is established over one or more frequency channels for the duration of the communication. Generally, the frequency spectrum available for a given radio system is a limited communication resource and several users may be competing for this resource. Thus, a radio communication system typically employs a frequency management methodology in order to maximize the efficient use of the available frequencies, and to minimize interference among users. This approach is useful where multiple communication links must be established over shared communication channels.

Many frequencies sharing methodologies are known in the art. Examples include channel hopping, direct sequence spread spectrum, time division multiplex, and other similar schemes. Most prior art frequency sharing methods employ an infrastructure to manage the operational aspects of the radio communication system. An infrastructure typically includes a base station, or some other type of controller, which manages frequency assignments, user access, collision detection and resolution, and other operational aspects of the radio system. These controllers tends to represent a significant cost in the establishment of a radio communication system.

Low cost radio communication systems are becoming an increasingly important segment of the wireless communication market. These low cost systems must also successfully manage the use of shared frequencies in order to maximize efficiency and throughput. Some low cost systems involve self-organizing communication units which employ frequency management methodologies that do not require the use of a central controller. However, without a central controller, frequency management issues such as channel use allocation become more difficult. For example, a particular communication link may be operated in simplex transmission mode which require a particular transmission bandwidth. Another communication link may be established in which transmissions are in duplex mode requiring substantially more transmission bandwidth. Yet another communication link may be established in which data transmission requires a large allocation of transmission bandwidth. Such flexibility in allocation of transmission bandwidth is generally unavailable in low cost, infrastructureless, radio communication systems employing frequency hopping protocols. It is desirable to provide a system which accommodates different transmission bandwidth needs while providing for a low cost infrastructureless system.

DETAILED DESCRIPTION OF THE PREFERRED EMBODIMENT

Figure 1:
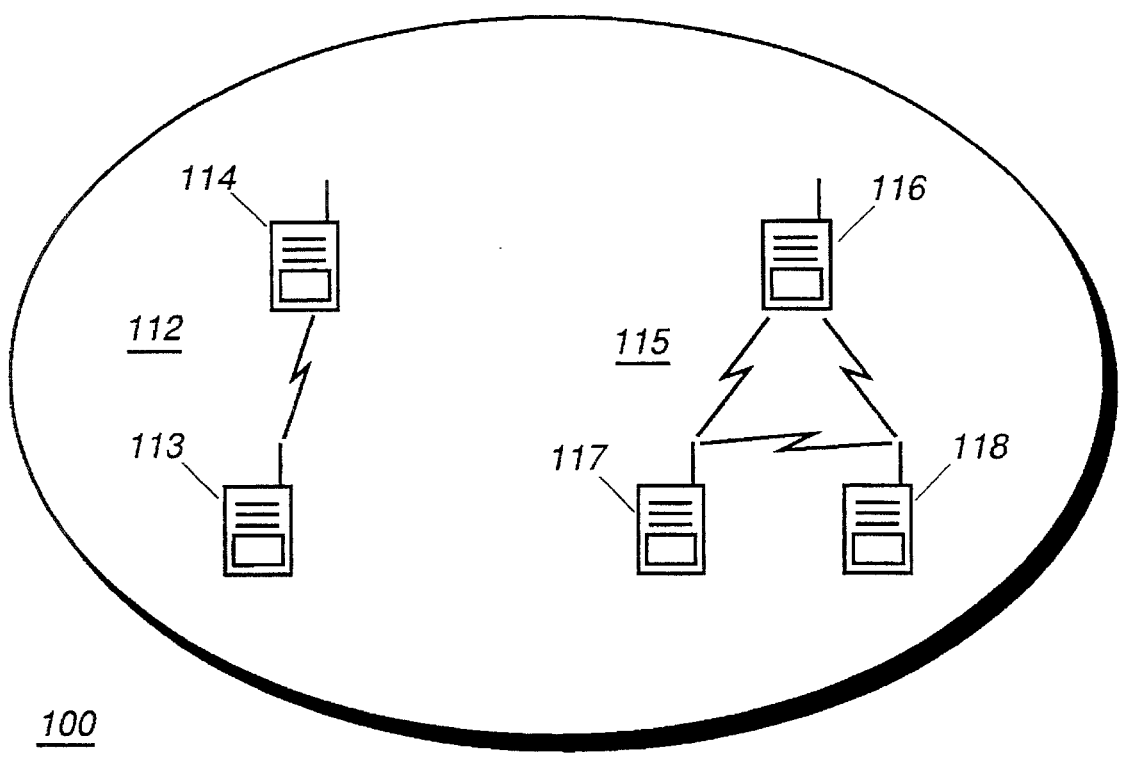
FIG. 1 is a block diagram of a radio communication system having groups of communicating transceivers, in accordance with the present invention

While the specification concludes with claims defining the features of the invention that are regarded as novel, it is believed that the invention will be better understood from a consideration of the following description in conjunction with the drawing figures, in which like reference numerals are carried forward.

Generally, the present invention provides for a method of organizing a channel hopping protocol based radio communication system which supports variable bandwidth transmissions. In a preferred embodiment, a portion of the radio frequency spectrum, is organized into channel blocks of adjacent communication channels, including a channel block of reservation channels. Channel sequences for channel hopping purposes, are organized from the channel blocks such that each sequence includes a communication channel from each channel block, including a reservation channel. A transceiver communicates over one or more sequences simultaneously depending on the bandwidth needs of the transceiver. In one example, the transceiver reserves a communication slot on multiple sequences, each sequence having a communication channel adjacent to that of another sequence. The transceiver then communicates using a channel hopping protocol across the communication slots through successive communication channels of the multiple sequences. In another example of the same communication system, another transceiver reserves a communication slot on less than all of the sequences used by the first transceiver, the second transceiver requiring less bandwidth than the first transceiver. The present invention provides for an organization of communication resources, and an access methodology for these communication resources to facilitate variable bandwidth transmissions for different transceivers, or for the same transceiver operating in different modes, according to the communication needs of the respective transceiver.

Referring now to FIG. 1, a radio communication system 100 is shown that has different groups of communication devices, such as transceivers, operating under a communication channel hopping protocol, in accordance with the present invention. In the preferred embodiment, the communication devices are two-way portable radio transceivers capable of establishing radio frequency (RF) communication links. Other types of communication devices may be used, such as mobile radios, base stations, repeaters, and the like. The radio system 100 has two groups 112, 115, of communicating transceivers. A first group 112 includes two transceivers 113, 114 with an established communication link between them. A second group 115 includes three transceivers 116, 117, 118, also communicating over an established communication link. The present invention recognizes that interference between the groups of transceivers 112, 115, is likely if both groups of transceivers 112, 115 are operating independently. For example, both groups, 112, 115 may be channel hopping over the same sequence of communication channels or on sequences which overlap. The interference would be significant if the communicating groups 112, 115 were sufficiently close to each other and were attempting to channel hop simultaneously through the same communication channels. The present invention provides for a channel access and a channel hopping protocol which supports management of the communication resources of the radio communication system without the need for infrastructure support.

According to the present invention, both groups of transceivers, 112, 115 channel hop among a predetermined sequence of communication channels. In the preferred embodiment, the communication channels comprise a plurality of frequencies organized into a sequence of frequency channels. The frequencies are a subset of the frequency spectrum available for radio communication. The communication channel may comprise one or more frequency channels, such as a transmit and receive pair or similar grouping. The channel hopping protocol further defines a channel hop period, i.e., the period of time which a transceiver, or group of transceivers may spend continuously utilizing a given communication channel. The channel hopping of the first group 112 is time coordinated with the channel hopping of the second group 115. The time coordinated operation between the groups 112, 115 is achieved using individual transceivers 113, 114, 116, 117, 118, operating under a protocol taught by the present invention, the details of which are provided below. The result is a self-organizing radio communication system 100 which does not require a central controller such as a base station, for frequency allocation and access management.

Figure 2:
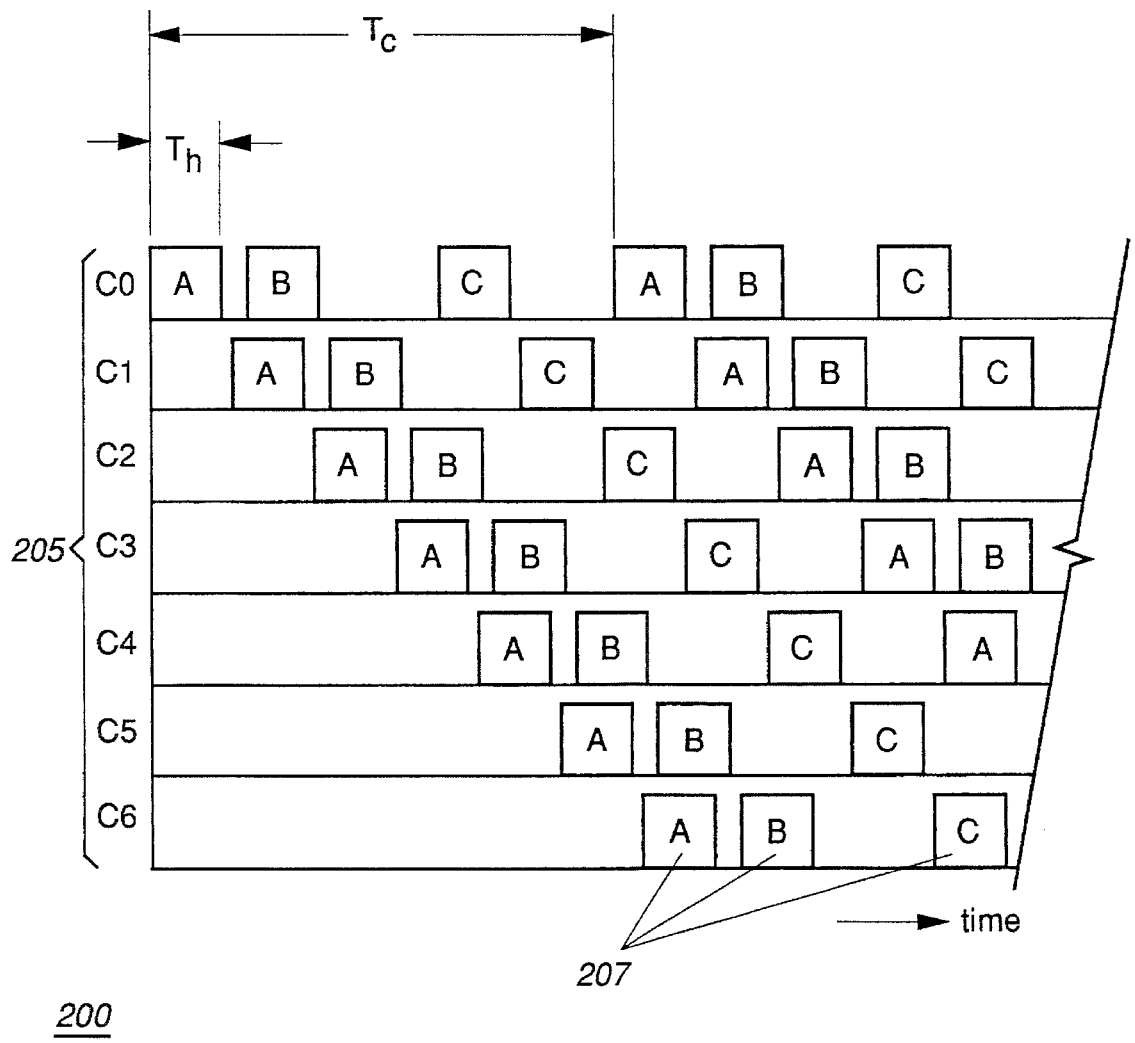
FIG. 2 is a timing diagram of communication on a sequence of communication channels, in accordance with the present invention.

FIG. 2 is a timing diagram 200 of communication on a sequence of communication channels 205 such as that utilized by the radio communication system 100. A channel hopping protocol is defined for the sequence and includes parameters such as a channel hop period, $T_h$, and a hop cycle, $T_c$. The channel hop period is defined as described above. The hop cycle is the accumulated time spent each pass through the sequence by a communicating group. There are three communication groups 207, i.e., groups A, B, C, operating cyclically on communication channels, C0, C1, C2, C3, C4, C5, C6. A cycle is one pass through the sequence by a communicating group. Communication links have been established among transceivers of each group. These communicating transceivers maintain the link by channel hopping among the communication channels of the sequence.

The establishment of a communication link requires access to a communication channel which a targeted transceiver is monitoring. Accordingly, the present invention provides for a channel access protocol to facilitate this process. Before establishing a communication link, an initiating transceiver must perform system acquisition, i.e., acquiring a communication slot. The communication slot is generally a time slot, having duration equal to the hop period, which moves or cycles through successive channels of the sequence after each hop period. The radio communication system has a reservation channel, RC, to facilitate acquisition and maintenance of a communication slot on the sequence of communication channels. In the preferred embodiment, the RC is selected from among the sequence of communication channels. Generally, a channel succeeding the RC in the sequence is expected to be monitored by a targeted transceiver. The RC and monitored channel are preselected, and thus are known to transceivers wishing to create, or participate in the radio system. During system acquisition, the RC is used to reserve a communication slot. For example, in the sample sequence shown, communication channel C0 is selected as the RC, and the monitored channel is C1. The RC is also used to preserve a communication slot for communicating groups already operating on the sequence. Generally, a transceiver operating on the sequence of communication channels and wishing to secure its communication slot for a subsequent cycle on the sequence must transmit a reservation signal while on the RC. The transmission may assume various formats for collision detection purposes and does not have to be continuous. In the preferred embodiment, the RC is not used for standard data communication. However, the RC may be used for data communication in other embodiments.

The reservation signal of the present invention has some preferred characteristics. Preferably the reservation signal is transmitted such that it has an extended communication or transmission range beyond that of the communication range of signals on the other communication channels of the sequence. This may be accomplished by lowering data transmission rates, by providing more robust transmit symbols or by increasing the transmit power. The extended range offers additional protection from potential interferers operating outside the normal communication range of a member of a communicating group but within communication range of another member.

Figure 3:
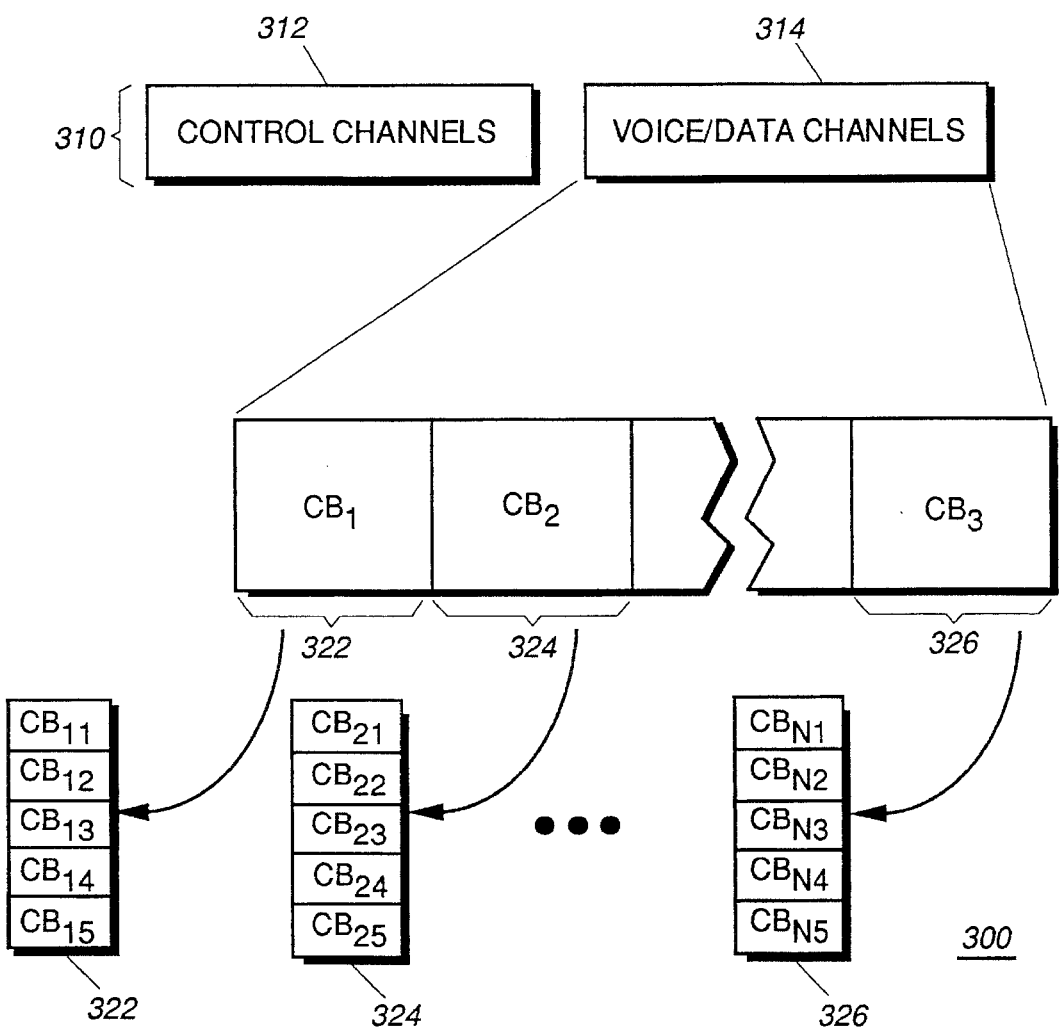
FIG. 3 is a block diagram depicting the organization of communication channels within the radio communication system, in accordance with the present invention.

Referring to FIG. 3, a block diagram 300 is shown depicting the organization of communication channels within the radio communication system, in accordance with the present invention. Preferably, frequency spectrum 310 allocated for use in the radio communication system is divided into control channels 312 and voice/data channels 314. The control channels 312 are used to gain access to the radio communication system (hereinafter referred to as "system acquisition"). Other communication channels 314 are designated as voice and/or data channels from which channel hopping sequences are defined. The organization of channel hopping sequences is a significant aspect of the present invention. The communication channels 314 are organized into groups of communication channels 322, 324, 326, designated $CB_1$, $CB_2$, and $CB_3$, each group of communication channels defining a channel block as used throughout this description. Preferably, each channel block 322, 324, 326 comprises a group of adjacent or otherwise paired communication channels $CB_{11}$–$CB_{15}$, $CB_{12}$–$CB_{25}$, $CB_{N1}$–$CB_{N5}$, respectively, where the first position of the subscript notation designates the particular channel block from which that communication channel was selected, and the second position of the subscript notation designates the position of the communication channel within the channel block. In the preferred embodiment, each channel block comprises contiguous frequency channels. The use of adjacent channels in a channel block facilitates variable bandwidth transmission, according to the present invention, in signaling schemes such as time division multiplexing.

Figure 4:
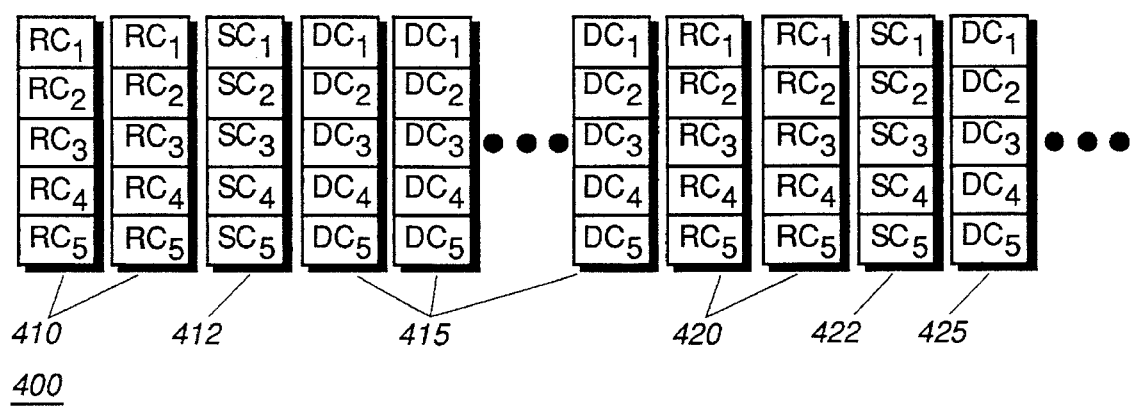
FIG. 4 is a block diagram of channel block designations, in accordance with the present invention.

Preferably, some of the channel blocks are reserved for specific operations which enhance system usability, including the establishment and maintenance of communication among transceivers. FIG. 4 shows a block diagram 400 of channel block designations of the preferred embodiment. One or more channel blocks 410, 420 are designated as reservation channel blocks, each including a group of reservation channels, $RC_{1-5}$. Reservation channel blocks 410, 420 are preferably used in pairs, for signal diversity, and distributed throughout a sequence, to facilitate system acquisition. Signaling channel blocks 412, 422, have channels $SC_{1-5}$ designated to support handshaking and protocol requirements that may be needed by a user of the radio communication system. Designated data channel blocks 415, 425 contain channels $DC_{1-5}$ on which data and/or voice communication is conducted. Channel hopping sequences are defined using communication channels from each channel block of a selected group of channel blocks. Preferably, each sequence has the same number of entries. In the preferred embodiment, a channel hopping sequence consists of at least one communication channel selected from the selected group of channel blocks, including a reservation channel selected from a reservation channel block, and is organized to have a designated order in which communication on the sequence is conducted.

Figure 5:
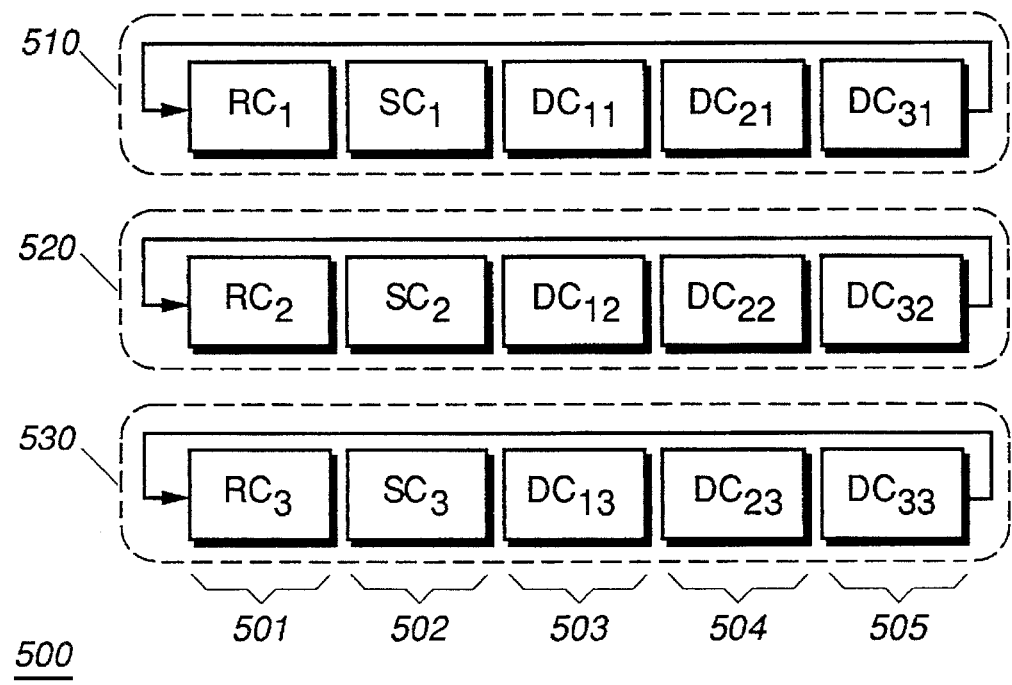
FIG. 5 is a block diagram showing potential channel hopping sequence designations, in accordance with the present invention.

For illustrative purposes, FIG. 5 shows potential channel hopping sequence designations 500 using a selected group of five channel blocks 501, 502, 503, 504, 505. The channel blocks include a reservation channel block 501 having channels $RC_{1-3}$, a signaling channel block 502 having channels $SC_{1-3}$, and three data channel blocks 503, 504, 505 having channels $DC_{11-13}$, $DC_{21-23}$, and $DC_{31-33}$. Preferably, the channels within each block are adjacent, such that $DC_{11}$ is adjacent to $DC_{12}$ which is adjacent to $DC_{13}$, and so on. A first sequence 510 contains the first communication channel from each channel block, i.e., $RC_1$, $SC_1$, $DC_{11}$, $DC_{21}$, $DC_{31}$; a second sequence 520 contains the second communication channel from each channel block, i.e., $RC_2$, $SC_2$, $DC_{12}$, $DC_{22}$, $DC_{32}$; and a third sequence 530 contains the third communication channel from each communication channel block, i.e., $RC_3$, $SC_3$, $DC_{13}$, $DC_{23}$, $DC_{33}$. Transceivers wishing to operate on the radio communication system, select one or more channel hopping sequences on which to communicate. When a transceiver selects only one channel hopping sequence, such as the first sequence 510, the transceiver communicates on the sequence in a communication slot which moves along on each channel of the sequence in succession after each channel hop period.

Figure 6:
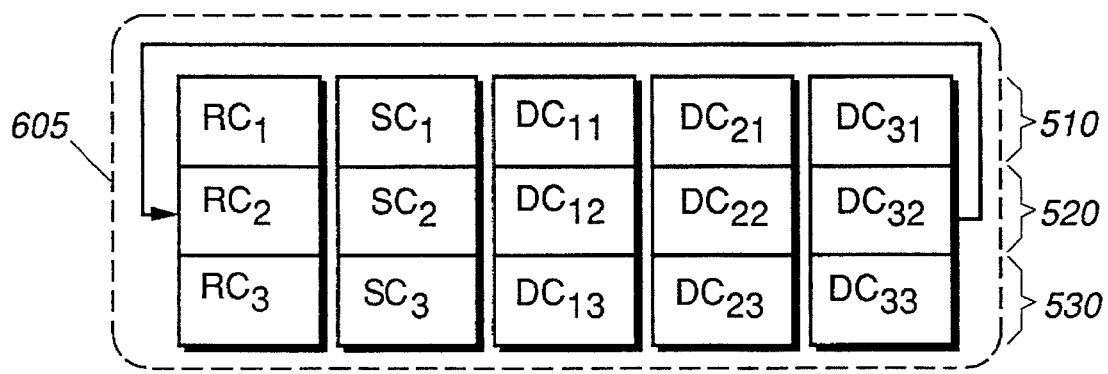
FIG. 6 is block diagram of a combination of channel hopping sequence, in accordance with the present invention.

According to the present invention, a transceiver may also elect to operate on multiple sequences as previously defined. For example, a transceiver wishing to communicate with an increased bandwidth may select two or more sequences, such as sequences 510, 520, and use these sequences in combination. This combination of sequences may also be viewed or considered as a single sequence which comprises multiple communication channels from each channel block. FIG. 6 is illustrative of a super sequence 605 formed from a combination of multiple channel hopping sequences 510, 520, 530, in accordance with the present invention. When sequences are so combined, the multiple channels selected from each channel block can also be viewed as a channel sub-block, which preferably contains adjacent communication channels of the channel block. A sequence comprising channel sub-blocks, i.e., multiple channels from each block, and a combination of sequences yielding the same channels are treated as equivalent For the purposes of this specification.

When a transceiver uses multiple sequences, channels of one sequence that correspond to channels of another sequence are preferably grouped to facilitate communication across both channels simultaneously. The radio system protocol of the present invention simultaneously supports transceivers that communicate over a combination sequences, while supporting transceivers that use at least one sequence of the combination sequence but that do not use all the sequences of the combination sequence. This aspect of the present invention provides for variable transmission bandwidths to support different communication needs of various users of the system. For example, a transceiver operating in a simplex transmission mode may only need to operate on a sequence having only one channel selected from each channel block. Yet, another transceiver may be operating in a duplex transmission mode, thereby requiring increased transmission bandwidth which can be satisfied by operating on a sequence which employs two communication channels from each channel block.

Figure 7:
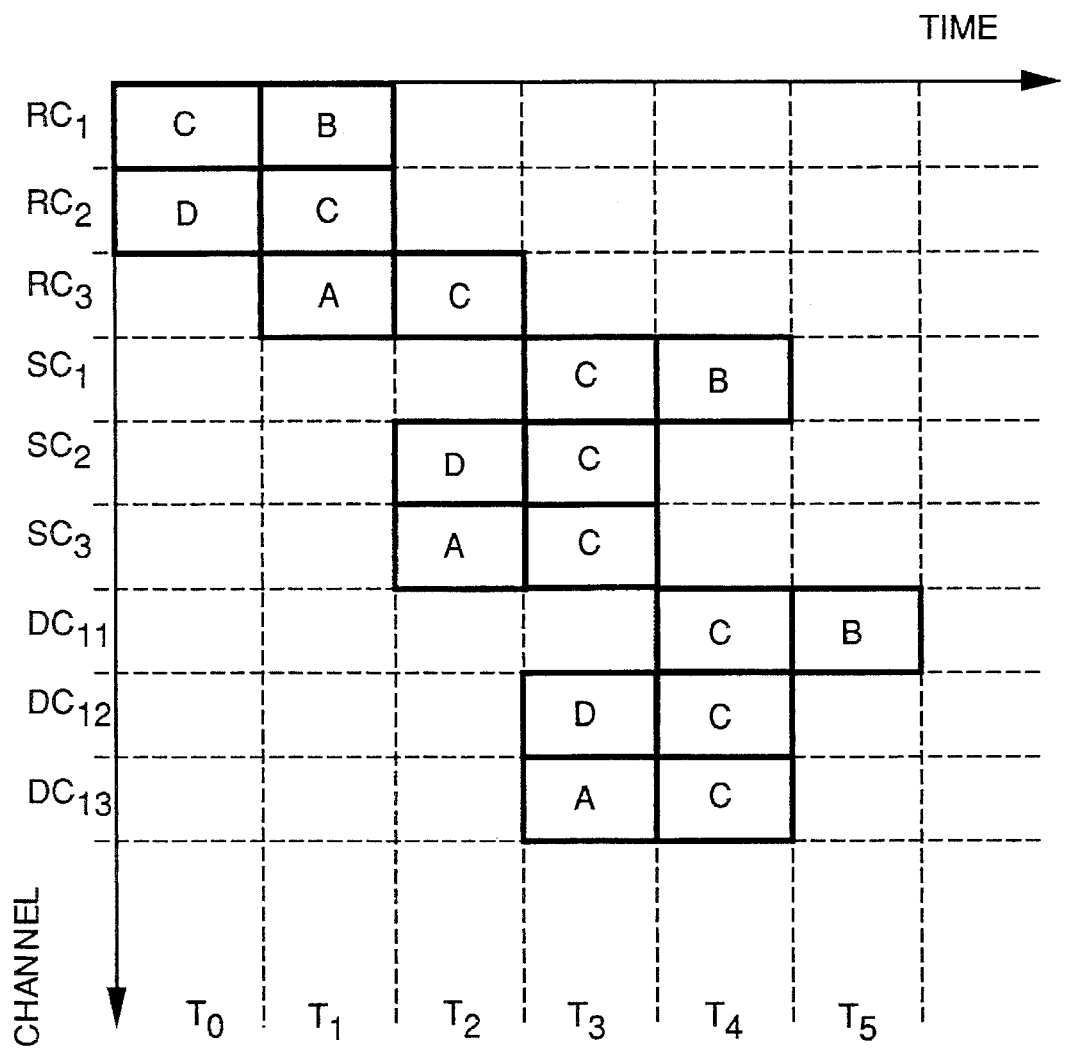
FIG. 7 is a block diagram illustrating transceiver operation on combination of channel hopping sequences, in accordance with the present invention.
Figure 8:
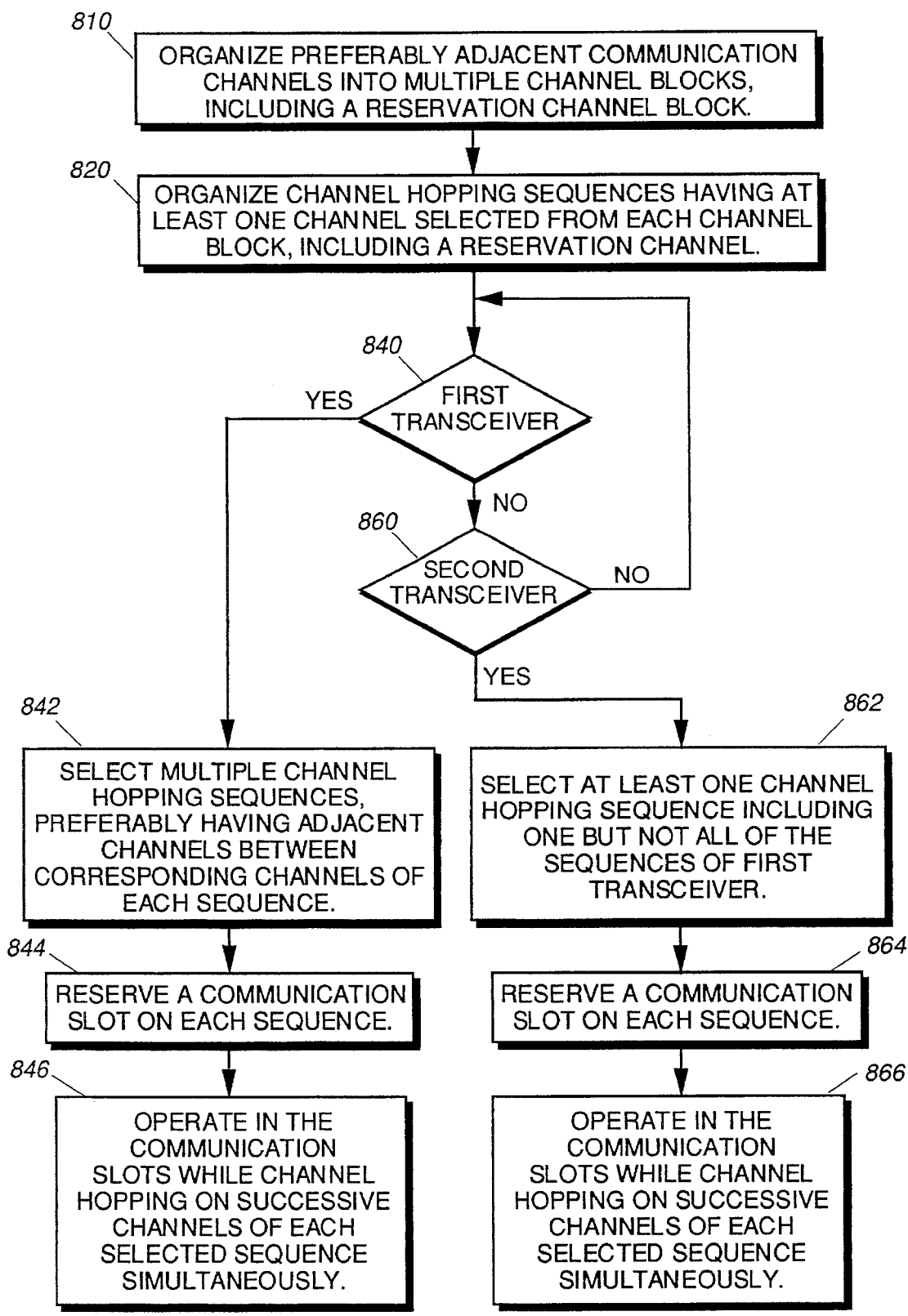
FIG. 8 is a flow chart of procedures used in operation of a radio communication system, in accordance with the present invention.

FIG. 7 shows a block diagram 700 illustrating transceiver operation during system acquisition of various combination of channel hopping sequences, in accordance with the present invention. FIG. 8 shows a flow chart 800 of procedures used in operation of a radio communication system, in accordance with the present invention. Referring to FIGS. 7 and 8, the radio communication system has adjacent communication channels organized into multiple channel blocks, including a reservation channel block, step 810, and channel hopping sequences organized to have at least one channel selected from each channel block, including a reservation channel, step 820, as described above. The radio communication system so organized has multiple transceivers or transceiver groups A, B, C, D operating thereon in various communication modes, with different levels of system utilization.

A transceiver operates on a sequence by reserving a communication slot on that sequence, and by communicating within the communication slot through successive communication channels of the sequence. In the preferred embodiment, the access or reservation procedure for a transceiver depends on the particular sequence or combination of sequences selected by the transceiver for communications. For example, in the example shown, transceivers are permitted to operate on a single sequence, or a combination of up to three sequences. Preferably, a transceiver operating on a combination of three sequences reserves a communication slot on each sequence in succession, such that a communication slot exists across the sequences on three adjacent channels, simultaneously. To facilitate this process, a successful reservation on a particular sequence reserves a communication slot on that sequence that has a potential delay of a multiple of the channel hop period. This multiple of the channel hop period may range from zero(0), up to one less than the maximum number of sequences on which a transceiver simultaneously communicates. In the example shown, no delay is imposed when reserving a communication slot on sequence 530, a one channel hop period delay is imposed when reserving a communication slot on sequence 520, and a two channel hop period delay is imposed when reserving a communication slot on sequence 510.

The transceivers A, B, C, D are shown operating on one or more of the channel hopping sequences 510, 520, 530, at times $T_0$, $T_1$, $T_2$, $T_3$, $T_4$, and $T_5$, that correspond to successive channel hop periods. Transceiver group C has selected a combination of channel hopping sequences 510, 520, and 530, which have adjacent channels among corresponding channels of each sequence, steps 840, 842. Alternatively, the channel hopping sequences are selected to support frequency division multiplex signaling when corresponding communication channels of the sequences are grouped. The combination of channel hopping sequences 510, 520, and 530 may also be viewed as a single combination sequence 605. A transceiver of the transceiver group C reserves a communication slot on each sequence 510, 520, 530 such that the communication slots simultaneously exist on adjacent channels across each sequence, step 844. At time $T_0$, transceiver of group C reserves a communication time slot on the first sequence 510 by monitoring for the transmission of a reservation signal by another transceiver on the respective reservation channel $RC_1$ over a duration of at least a channel hop period, and preferably during the same period, transmitting a reservation signal on the reservation channel to facilitate collision avoidance. The detection of a reservation signal of another transceiver would indicate that an open communication slot is not available on the sequence 510 at that time. While monitoring during time $T_0$, another reservation signal is not detected, and thus transceiver group C may communicate on a communication slot which by protocol is available on the sequence 510 at time $T_3$, i.e., after a delay of twice the channel hop period. However, if other transceivers were attempting to secure a communication slot on the sequence 510 during the reservation attempt by the transceiver of group C, a collision may occur which could potentially abort the attempt. Collision detection and resolution procedures may be incorporated to enhance overall radio communication system performance.

The transceiver of group C determines that an open communication slot exists across the sequences after having monitored, and preferably transmitting a reservation signal on, the reservation channel $RC_1$, $RC_2$, $RC_3$ of each sequence 510, 520, 530, using a similar procedure to that described above. Thus, at $T_1$ and $T_2$, communication slots are secured on sequences 520, 530. The communication slot reserved on sequence 520 at $T_1$ is available after a delay of one channel hop period, i.e., at time $T_3$. The communication slot reserved on sequence 530 at $T_2$ is available in the immediately succeeding channel hop period with no delay, i.e., at time $T_3$. Once the communication slots are secured, the transceiver group C operates in the open communication slots across the sequences while channel hopping on successive channels of each selected sequence simultaneously, step 846. The transceiver group C is able to operate across the sequences 510, 520, 530 on three adjacent channels simultaneously as shown, such as on $SC_1$, $SC_2$, $SC_3$, at $T_3$, and on $DC_{11}$, $DC_{12}$, $DC_{13}$, at $T_4$, etc. With a channel bandwidth extending across the sequences, the transceiver group C operates on communication channels grouped for using a time division multiplex signaling scheme or a frequency division multiplex signaling scheme.

Transceiver group A has selected a single sequence 530 for operation, and thus includes at least one, but not all, of the sequences selected by transceiver group C, steps 860, 862. At time $T_1$, a transceiver of the transceiver group A reserves a communication slot on the sequence 530 using a procedure similar to that described earlier, including the monitoring for, and the transmission of, a reservation signal on the reservation channel $RC_3$ of the sequence 530, over a duration of at least the channel hop period, step 864. The transceiver of group A does not detect a reservation signal, and thus determines that an open communication slot exist on the third sequence 530 at the immediately succeeding time period, i.e., at time $T_3$. The transceiver group A then operates in the communication slot while channel chopping on successive channels of the sequence 530, such as on $SC_3$ at time $T_3$, $DC_{13}$ at time $T_4$, etc., step 866.

Transceiver group D has selected a single sequence 520 for operation. At time $T_1$, a transceiver of the transceiver group D reserves a communication slot on the sequence 520. However, the open communication slot is available on the sequence 520 after a delay of one time period, i.e., at time $T_2$. The transceiver group D then operates in the communication slot on successive channels of the sequence 520, such as on $SC_2$ at time $T_2$, $DC_{12}$ at time $T_3$, etc.

Transceiver group B has selected a single sequence 510 for operation. At time $T_2$, a transceiver of the transceiver group B reserves a communication slot on the sequence 510. The open communication slot is available on the sequence 510 after a delay of two time periods, i.e., at time $T_4$. The transceiver group B then operates in the communication slot on successive channels of the sequence 510, such as on $SC_1$ at time $T_4$, $DC_{11}$ at time $T_5$, etc. Each transceiver group A, B, C, D maintains its communication slot on its respective sequence or sequences by transmitting a reservation signal when on the reservation channel at the start of each subsequent cycle through the sequence(s).

By reserving one sequence at a time, the transmission of reservation signals in extended range is facilitated, regardless of the number of sequences concurrently used by a transceiver, as transmission energy is concentrated on a single channel. By staggering the availability of communication slots depending on the sequence selected, the reservation of communication slots across multiple sequences, using successive reservations is supported. If the extended range of reservation signals is not necessary, or could be provided by alternative means, such as by increasing transmission power and the like, multiple sequences could be reserved by simultaneous transmissions across the reservation channels of the respective sequences.

The present invention provides for a radio communication system that allows different transceiver groups with varying transmission bandwidth needs to operate on shared frequencies, while providing for frequency use management without the need for an infrastructure. Frequency use management is provided for transceivers having a particular bandwidth requirement to use sub-blocks of adjacent communication channels in one channel hopping sequence, and for transceivers having a different bandwidth requirement to use a portion of each sub-block in another channel hopping sequence in the same communication system. The flexibility in allocation of transmission bandwidth of the channel hopping protocol yields significant benefits. For example, multiple tiered products such as low cost simplex and higher cost duplex communication devices, and other data communication devices, may all co-exist in a single infrastructureless system, while promoting the efficient use of shared communication resources.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. In a radio communication system having a channel hopping protocol with a channel hop period, the radio communication system having a plurality of communication channels grouped into a plurality of channel blocks, including a channel block of reservation channels, the radio communication system having a plurality of channel hopping sequences organized from the plurality of channel blocks, each channel hopping sequence comprising a communication channel from each channel block, including a reservation channel from the channel block of reservation channels, a method comprising the steps of:

at a first transceiver:
selecting a plurality of channel hopping sequences;
reserving a communication slot on each channel hopping sequence of the plurality of channel hopping sequences such that corresponding communication slots exist on a group of channels simultaneously across the plurality of channel hopping sequences; and
operating on the communication slots through successive communication channels of the plurality of channel hopping sequences, respectively, according to the channel hopping protocol.

2. The method of claim 1, wherein:

the step of selecting comprises the step of selecting each channel hopping sequence to have each communication channel adjacent to a corresponding communication channel of another sequence of the plurality of channel hopping sequences; and the step of reserving comprises the step of reserving communication slots that exist simultaneously on adjacent communication channels across multiple channel hopping sequences.

3. The method of claim 2, wherein the step of operating comprises the step of communicating on the communication slots across the adjacent communication channels using a time division multiplex signaling scheme.

4. The method of claim 1, wherein:

the step of selecting comprises the step of selecting the plurality of channel hopping sequences to support frequency division multiplex signaling when corresponding communication channels of the sequences are grouped; and the step of reserving comprises the step of reserving communication slots that exist simultaneously on the corresponding communication channels across the plurality of channel hopping sequences.

5. The method of claim 4, wherein the step of operating comprises the step of communicating on the communication slots using a frequency division multiplex signaling scheme.

6. The method of claim 1, wherein the step of reserving a communication slot further comprises the steps of:

at the reservation channel of each channel hopping sequence of the plurality of channel hopping sequences, in succession: monitoring the reservation channel to detect a reservation signal of another transceiver over a duration of the channel hop period;

determining that an open communication slot exists on the channel hopping sequence on when a reservation signal of another transceiver was not detected.

7. The method of claim 6, wherein the step of reserving a communication slot further comprises the step of transmitting a reservation signal on the reservation channel during the channel hop period that the reservation channel is being monitored.

8. The method of claim 1, wherein the step of operating on the communication slots comprises the step of delaying operation on a particular sequence for a delay period dependent on the particular sequence.

9. The method of claim 8, wherein the step of delaying operation comprises the step of delaying a time period equivalent to a multiple of the channel hop period.

10. The method of claim 1, further comprising the steps of: at a second transceiver:

selecting at least one channel hopping sequence including one but not all of the plurality of channel hopping sequences; and operating within a communication slot on each channel hopping sequence of the at least one channel hopping sequence, through successive communication channels of the at least one channel hopping sequence, according to the channel hopping protocol.

11. A method for a channel hopping communication system with variable transmission bandwidth, the communication system having a channel hopping protocol with a channel hop period, the method comprising the steps of:

organizing a plurality of communication channels into a plurality of channel blocks, including a channel block of reservation channels;

organizing a plurality of hopping sequences, each hopping sequence comprising at least one channel from each channel block, including a reservation channel from the channel block of reservation channels;

at a first transceiver:
reserving a first communication slot on a first hopping sequence selected from the plurality of hopping sequences, via the reservation channel of the first hopping sequence;
reserving a second communication slot on a second hopping sequence selected from the plurality of hopping sequences, via the reservation channel of the second hopping sequence;
operating under the channel hopping protocol, simultaneously in the first and second communication slots, on successive communication channels of the first and second hopping sequences;

at a second transceiver:
reserving a third communication slot on the first hopping sequence but not on the second hopping sequence, via the reservation channel of the first hopping sequence;
operating under the channel hopping protocol in the third communication slot on successive communication channels of the first hopping sequence.

12. The method of claim 11, wherein the step of reserving a first communication slot and the step of reserving a second communication slot comprise the step of monitoring, over a duration of at least a channel hop period, for a reservation signal transmitted by another transceiver successively on the reservation channel of the first and second hopping sequences.

13. The method of claim 12, wherein the step of operating under the channel hopping protocol, simultaneously in the first and second communication slots, comprises the steps of:

delaying operation on the first channel hopping sequence for at least one channel hop period after reserving the first communication slot; and operating on the second channel hopping sequence in an immediately succeeding channel hop period after reserving the second communication slot.

14. The method of claim 11, wherein the step of reserving a first communication slot comprises the steps of:

monitoring the reservation channel of the first hopping sequence to detect if a reservation signal is being transmitted; and determining that an open communication slot exists when a reservation signal is not detected.

15. A method for a channel hopping communication system with variable transmission bandwidth, the communication system having a channel hopping protocol with a channel hop period, the method comprising the steps of:

organizing a plurality of communication channels into a plurality of channel blocks of adjacent communication channels; at a first transceiver:

selecting a first sequence of communication channel sub-blocks from the plurality of channel blocks, each communication channel sub-block having at least a pair of adjacent channels selected from each of the plurality of channel blocks; and operating in a first communication slot on successive communication channel sub-blocks of the first sequence according to the channel hopping protocol;

at a second transceiver:

selecting a second sequence of communication channel sub-blocks from the plurality of channel blocks, each communication channel sub-block of the second sequence having at least one, but not all, of the channels of each communication channel sub-block of the first sequence; and operating in a second communication slot on successive communication channel sub-blocks of the second sequence according to the channel hopping protocol.

16. The method of claim 15, wherein the step of organizing a plurality of communication channels comprises the step of selecting one of the plurality of channel blocks as a reservation channel block, the reservation channel block including a plurality of reservation channels.

17. The method of claim 16, wherein the step of operating in a first communication slot comprises the step of reserving a first communication slot within the first sequence of communication channels by operating on each reservation channel of the reservation channel block, that corresponds to the at least a pair of adjacent channels.

18. The method of claim 17, wherein the step of reserving a first communication slot comprises the step of transmitting a reservation signal on each reservation channel of the first sequence in successive channel hop periods.

19. The method of claim 17, wherein the step of reserving a first communication slot further comprises the steps of:

monitoring, in succession, at each reservation channel that corresponds to the at least a pair of adjacent channels, for a reservation signal on the reservation channel over a duration of at least a channel hop period; and determining that an open communication slot exists when a reservation signal is not detected on any reservation channel during monitoring.

\* \* \* \* \*